A. P. Holmes.
Bobbin.

No. 73185. Patented Jan. 7, 1868.

Witnesses.

Inventor.

United States Patent Office.

ALBION P. HOLMES, OF GREAT FALLS, NEW HAMPSHIRE.

Letters Patent No. 73,185, dated January 7, 1868.

IMPROVEMENT IN BOBBINS.

The Schedule referred to in these Letters Patent and making part of the same.

TO ALL WHOM IT MAY CONCERN:

Be it known that I, ALBION P. HOLMES, of Great Falls, in the county of Strafford, and State of New Hampshire, have invented new and useful Improvements in Spools or Bobbins used in cotton and woollen-mills; and I do hereby declare that the following is a full, clear, and exact description thereof, which will enable others skilled in the art to make and use the same, reference being had to the accompanying drawings, and to the letters of reference marked thereon.

The present invention consists in loading or weighting a wooden spool or bobbin, such as is used in cotton and woollen-mills, by applying a metallic sheathing to the cylinder, or an equivalent thereof, in lieu of yarn, as heretofore. In the accompanying plate of drawings my improved spool or bobbin is illustrated—

Figure 1:
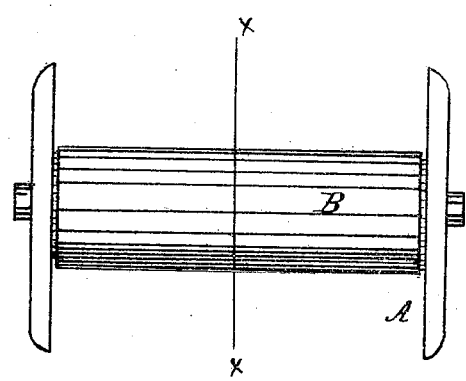

Figure 1 being a side view of the same, and

Figure 2:
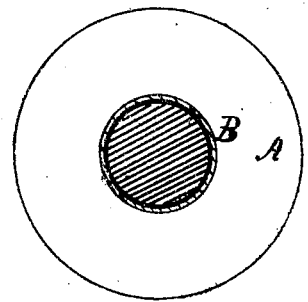

Figure 2 a transverse vertical section, taken in the plane of the line $x\ x$, fig. 1.

A, in the drawing, represents a wooden bobbin or spool, of the ordinary construction, and B the metallic or other equivalent sheath or covering, applied to the body of the same, for loading or weighting it.

Any required amount of tension can be obtained in the warper, proportioned to the number of the yarn used, by the use of a set of attachments of different weights, a finer thread requiring a lighter loading to the spool than a coarser one.

Having thus described my invention, I claim as new, and desire to secure by Letters Patent—

The spool or bobbin, having its solid wooden body surrounded by the metallic cylinder between the end-disks, the bearings of said spool being composed of wood, as herein described, for the purpose specified.

The above specification of my invention signed by me, this 26th day of August, 1867.

ALBION P. HOLMES.

Witnesses:
  JOHN S. HAINES,
  JOHN N. HAINES.